Nov. 9, 1965 R. B. HUNTINGTON 3,217,110

EXTENSION TELEPHONE SYSTEM AND ACTUATOR

Filed March 2, 1962 2 Sheets-Sheet 1

INVENTOR.
R. BRUCE HUNTINGTON
BY Harris R. Isaacson
ATTORNEY

EXTENSION TELEPHONE SYSTEM AND ACTUATOR

Filed March 2, 1962 2 Sheets-Sheet 2

INVENTOR.
R. BRUCE HUNTINGTON

BY Harris B. Isaacson

ATTORNEY

United States Patent Office 3,217,110
Patented Nov. 9, 1965

3,217,110
EXTENSION TELEPHONE SYSTEM AND ACTUATOR

Richard Bruce Huntington, 240 Oak St., Lewiston, Maine

Filed Mar. 2, 1962, Ser. No. 176,984
3 Claims. (Cl. 179—81)

This invention relates to an extension phone system adapted to operate in conjunction with another telephone system without electrical interconnection.

In the past repeaters have been used in connection with existing telephone circuitry without electrical interconnections. Repeaters of the past have been very limited in their flexibility of function and have not been able to fully cooperate with another telephone system without electrical interconnection.

According to the present invention a remote actuator and an extension telephone system are provided which are adapted to function from one or a plurality of telephone extensions with each telephone extension adapted to operate and cooperate with another telephone system without electrical interconnection.

Although such novel features as are believed to be characteristic of the invention and are pointed out in the claims, the invention and the manner in which it may be carried out, may be further understood by reference to the description following and the accompanying drawings.

Referring now to the figures in greater detail, where like reference numbers denote like parts in the various figures.

Figure 1:
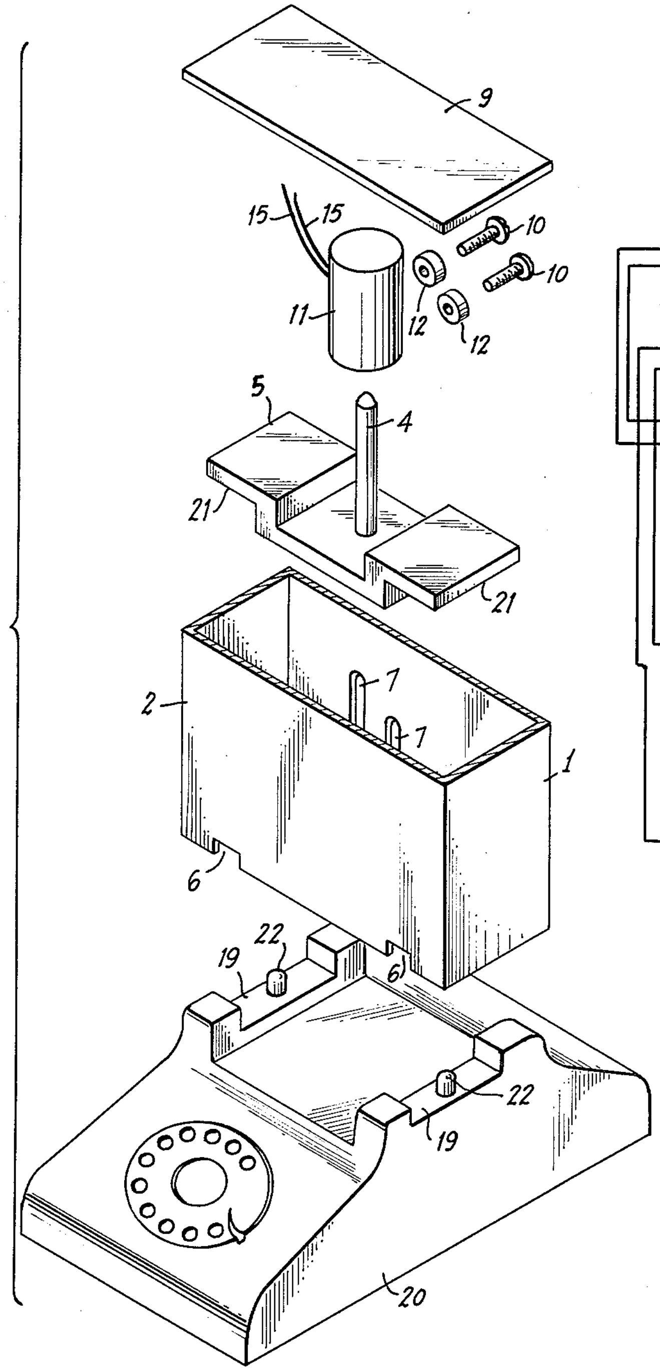
FIGURE 1 is an exploded view of the actuator of the present invention and a telephone in another system.

The actuator 1 of the present invention as shown in FIGS. 1, 2, 3 and 4 comprises a housing 2, a solenoid 3, a solenoid core 4 and a telephone cradle saddle 5. The housing 2 is provided with recesses 6, adjustment slots 7 and a top 9. The top 9 may be integral to the housing 2. The housing 2 is adapted to fit over the cradle of a telephone in an existing telephone system.

The solenoid 3 is adjustably attached inside the housing 2 by screws 10 which pass through the adjustment slots 7 into threaded holes in the solenoid frame 11 spaced apart from the wall of the housing 2 by spacers 12. The core 4 is adapted to moveably fit into the solenoid bore 13 with the saddle 5 positioned beneath it. The core 4 and saddle 5 may be two separate pieces held together by a pin 14. The contact wires 15 lead from the solenoid 3 to connect to the appropriate actuator 1 circuitry.

Figure 5:
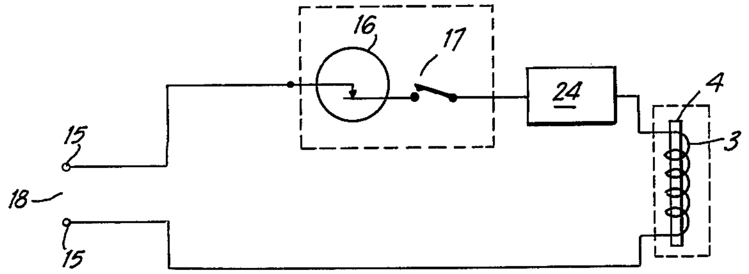
FIGURE 5 is a schematic diagram of the circuitry of the actuator of the present invention.

The schematic diagram of the actuator 1 and its circuitry are shown in FIGURE 5. The solenoid 3 with the core 4 are in series with a telephone dial 16 and a telephone cradle switch 17 which is a part of a telephone in the extension telephone system of the present invention. A power supply 18 for the system, such as a battery or filtered D.C., provides a steady source of D.C. current to operate the solenoid 3 so that the core 4 is responsive only to the electric pulses from the dial 16 or the control switch 17.

In operation the actuator 1 is fitted over the cradle 19 of a telephone 20, which is part of another telephone system. The inset of the recesses 6 provides a snug fit.

The ends 21 of the saddle 5 are set in position so that they overlie the telephone control switch buttons 22. The solenoid 3 is then adjusted up or down in the adjustment slots 7 by loosening screws 10 then tightening them so that the raised saddle 5 and ends 21 are at a distance above the telephone 20 such that upon the completing of the actuator circuit the core 4 lifts the ends 21 of the saddle 5 allowing the control switch 22 to rise just sufficiently to complete the circuit on the phone 20 of the other telephone system. The dials 16 on the extension telephones 24 are in series circuitry as shown in FIGURE 5 with the actuator 1 and also in series with the control switches 17 of the extension telephones 24.

Figure 6:
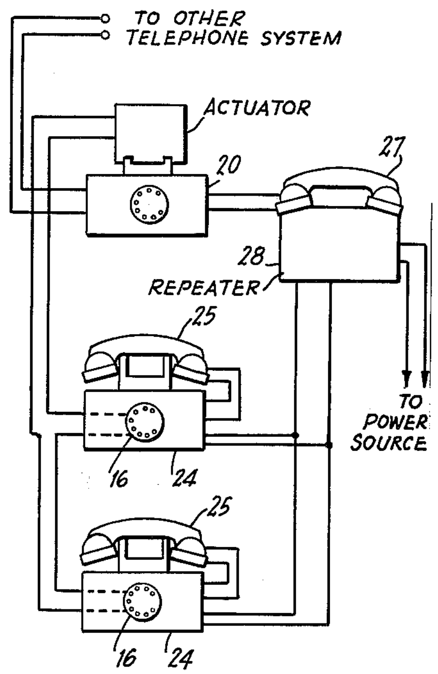
FIGURE 6 is a block diagram showing the interfunctioning of the present invention with another telephone system.
Figure 2:
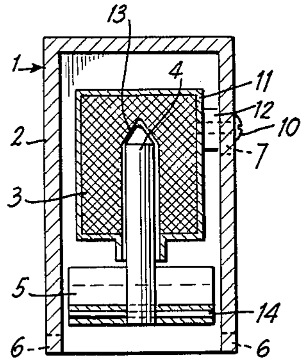
FIGURE 2 is a cutaway view of a side elevation of the actuator of the present invention.
Figure 3:
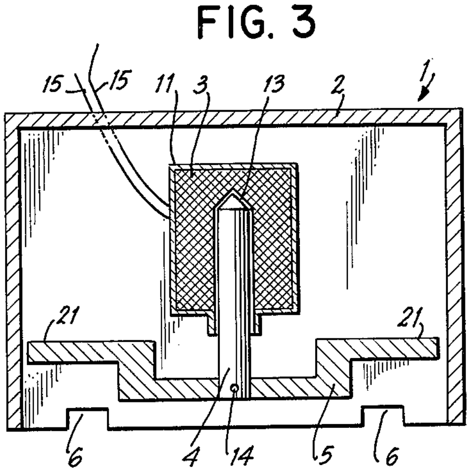
FIGURE 3 is a cut away view of a front elevation of actuator of the present invention.
Figure 4:
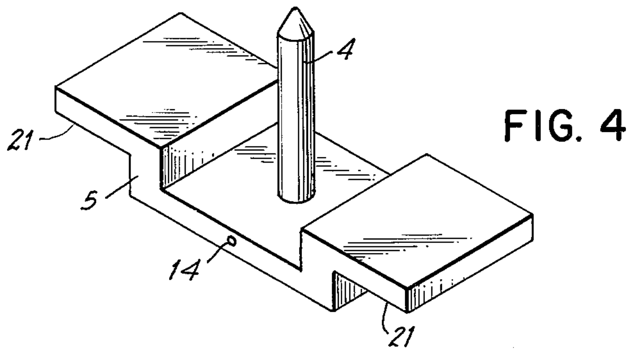
FIGURE 4 is a detail of the solenoid core and saddle of the actuator of the present invention.

Lifting the transmitting and receiving handpiece 25 of the extension telephones 24 as shown in the block diagram FIG. 6, completes a circuit within the extension telephones 24 as its control switch 17 rises. The circuit includes the dial 16 and the solenoid 3 of the actuator 1, all in series. The completed circuit activates the solenoid 3 which when activated lifts the core 4 and the attached saddle 5. The raised saddle ends 21 when lifted permit the control switch on the phone 20 of the other telephone system to complete the telephone circuit so that it may operate. The receiving and transmitting handpiece 27 of the telephone in the other phone system is placed in physical contact or in the vicinity of the transmitting and receiving repeater 28 which also serves as a rest for the handpiece 27.

When the circuit of the other telephone system is operational and the circuit of the extension phone system of the present invention is operational, signals sent through either are picked up and relayed to the other, from the repeater 28 to the telephone handpiece 27 or from the handpiece 27 to the repeater 28 and through the handpiece 27 of the extension telephone system of the present invention.

An example of the cooperation of the system is as follows: an incoming phone call comes in on the other phone system. The handpiece 25 of the extension telephones 24 is lifted. The lifting of the handpiece 25 of the extension telephones 24 completes the circuitry in the actuator 1 activating the solenoid 3 which lifts the core 4 and saddle 5, thus permitting the control switch 22 in the other telephone system telephone 20 to have its circuitry completed in the normal way to make or receive a telephone call. Simultaneously the circuitry in the extension telephone system of the present invention is also completed, allowing the extension telephone 24 to transmit and receive signals through the transmitting and receiving repeater 28 which is in effect a microphone and a loud speaker combination. Any signal coming in from the telephone 20 will be sent through the repeater 28 and may be picked up by any of the extension telephones 24. Signals from the extension telephones 24 will likewise be sent through the repeater 28 and be sent through the handpiece 27 of the other telephone system telephone 20, thus enabling complete telephonic communication.

An additional feature of the present invention is its ability to make an outgoing telephone call as if dialing the telephone of the other telephone system without electrical interconnection.

The dial 16 of the extension telephones 24 selectively creates a given number of electric pulses by repeated circuit breaking or interrupting similar to the pulse caused by dialing the other telephone 20. Telephone dials in effect generate pulses by breaking circuitry a selected number of times at a predetermined frequency, the sequences of these pulses determine the station to which the telephone is connected. The control switch 19 on the telephone in the other telephone system also can cause a circuit breaking thus causing a telephone to be connected to the same telephone station that would be reached through ordinary dialing.

When the solenoid 3 is adjusted to the proper height in the slots 7 by adjusting with the screws 10 the operation of the dial 16 on the extension telephone and breaks the circuit in the solenoid 3 at the dial frequency. The circuit breaking in the solenoid 3 causes the core 4 and saddle 5 to be lifted and dropped, oscillating at the same frequency as the dial pulse. The pulsing signal in the other telephone system is completed as if by ordinary dialing of the telephone in the other telephone system by physical oscillating of the control switch 22 generating a pulse signal on such telephone in the other system. In effect there is a dial interrelationship of the two systems without electronic interconnections.

The terms and expressions which are employed are used as terms of description, it is recognized, though, that various modifications are possible within the scope of the invention claimed.

What is claimed is:

1. An extension telephone system adapted to operate in conjunction with another telephone system said extension telephone system including a plurality of extension telephones; each said telephone including means selectively adapted to cause an electric pulse; a telephone handpiece; switch means in series circuitry with said pulse means and said telephone handpiece; signal means including a solenoid and a core adapted to actuate switch means of a telephone in another telephone system; a repeater in circuit with said extension telephone adapted to cooperate with a telephone handpiece in another telephone system without electrical interconnection; a power supply for said extension telephone system; and at least the switch means and pulsing means of said telephones in said extension telephone system and said solenoid in series circuitry.

2. An extension telephone system adapted to operate in conjunction with another telephone system said extension telephone system including at least one extension telephone; including a dial selectively adapted to break circuitry in such extension telephone a given number of times, a receiving and transmitting handpiece, a control switch in series circuitry with said dial and said receiving and transmitting handpiece; a housing adapted to rest on the cradle of a telephone in another telephone system, a solenoid in said housing, a magnetizable core adapted to be lifted by said solenoid, a saddle fast to said core adapted to be lifted with said core, said saddle further adapted to rest on a control switch of a telephone in said other telephone system so that the control switch may rise and complete the electric circuit of said telephone in such other telephone system; a rest for a receiving and transmitting handpiece of a telephone in such other telephone system, said rest including a receiving and transmitting repeater in circuit with said extension phone and adapted to cooperate with a telephone handpiece from said other telephone system on said rest without electrical interconnection; a power supply for said extension telephone system; and at least said dial and control switch of said extension telephone and solenoid in series circuitry.

3. An extension telephone system adapted to operate in conjunction with another telephone system said extension telephone system including at least one extension telephone; including a dial selectively adapted to break circuitry in such extension telephone a given number of times, a receiving and transmitting handpiece, a control switch in series circuitry with said dial and said receiving and transmitting handpiece; a housing adapted to rest on the cradle of a telephone in another telephone system, a solenoid in said housing, a magnetizable core adapted to be lifted by said solenoid, a saddle fast to said core adapted to be lifted with said core, said saddle further adapted to rest on a control switch of a telephone in said other telephone system so that the control switch may rise and complete the electric circuit of said telephone in such other telephone system; a rest for a receiving and transmitting handpiece of a telephone in such other telephone system, said rest including a receiving and transmitting repeater in circuit with said extension phone and adapted to cooperate with a telephone handpiece from said other telephone system on said rest without electrical interconnection; a power supply for said extension telephone system; and said extension telephone including said dial and control switch and receiving and transmitting handpiece and said solenoid and said receiving and transmitting repeater all in series circuitry with said power supply.

References Cited by the Examiner

UNITED STATES PATENTS

| | | | |
|---|---|---|---|
| 1,973,081 | 9/34 | Keiser | 179—1 |
| 2,080,586 | 5/37 | Varley | 179—1 |
| 2,371,051 | 3/45 | Kendig | 179—5 |
| 3,131,260 | 4/64 | Evans | 179—5 |

ROBERT H. ROSE, *Primary Examiner.*

WALTER L. LYNDE, *Examiner.*